T. G. McGIRR.
MACHINE FOR APPLYING HOODS TO ARTICLES.
APPLICATION FILED MAY 4, 1918. RENEWED NOV. 28, 1921.

1,423,237.

Patented July 18, 1922.
6 SHEETS—SHEET 1.

Inventor
Theodore G. McGirr
By Rob't P. Hains
Attorney

T. G. McGIRR.
MACHINE FOR APPLYING HOODS TO ARTICLES.
APPLICATION FILED MAY 4, 1918. RENEWED NOV. 28, 1921.
1,423,237.
Patented July 18, 1922.
6 SHEETS—SHEET 2.
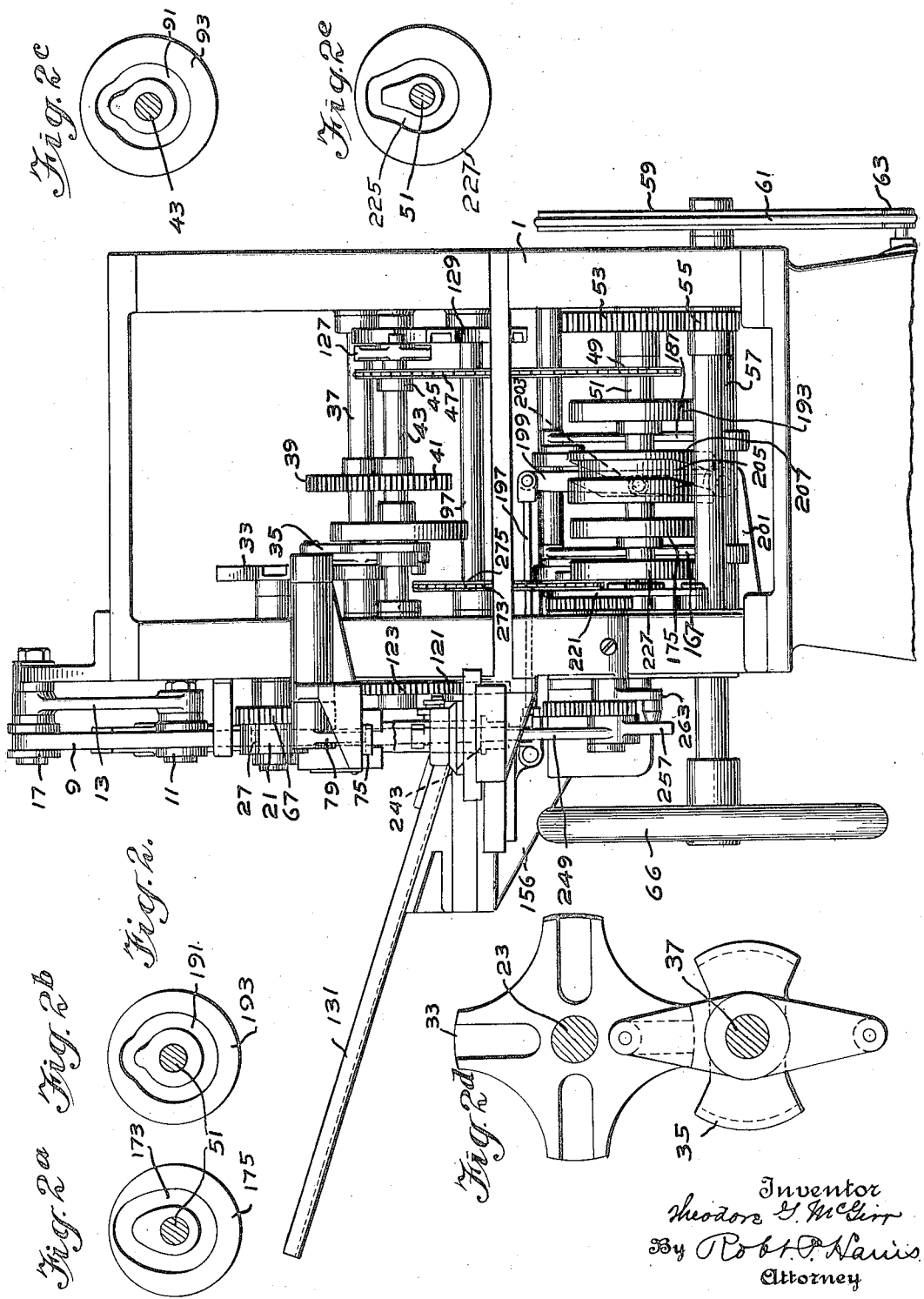

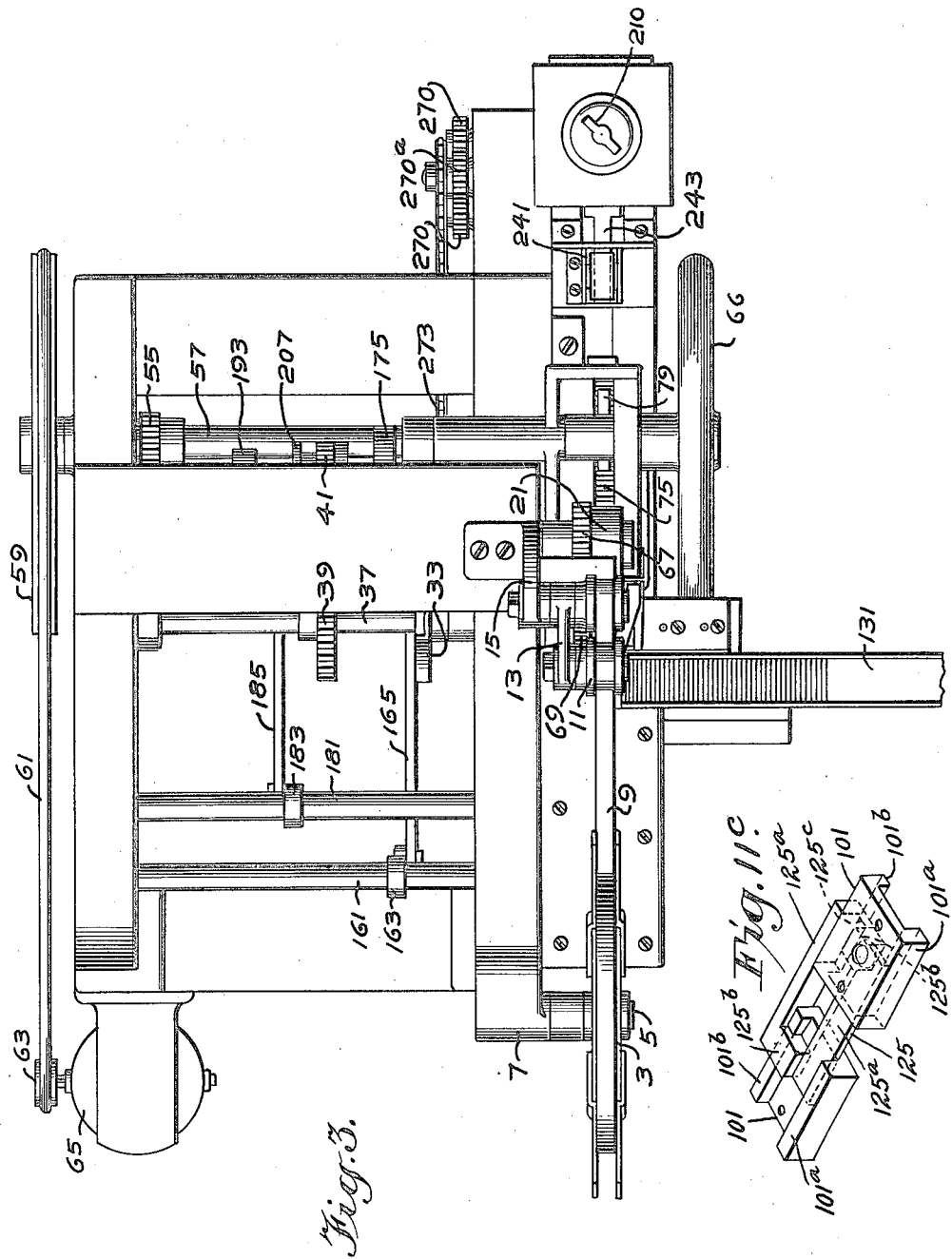

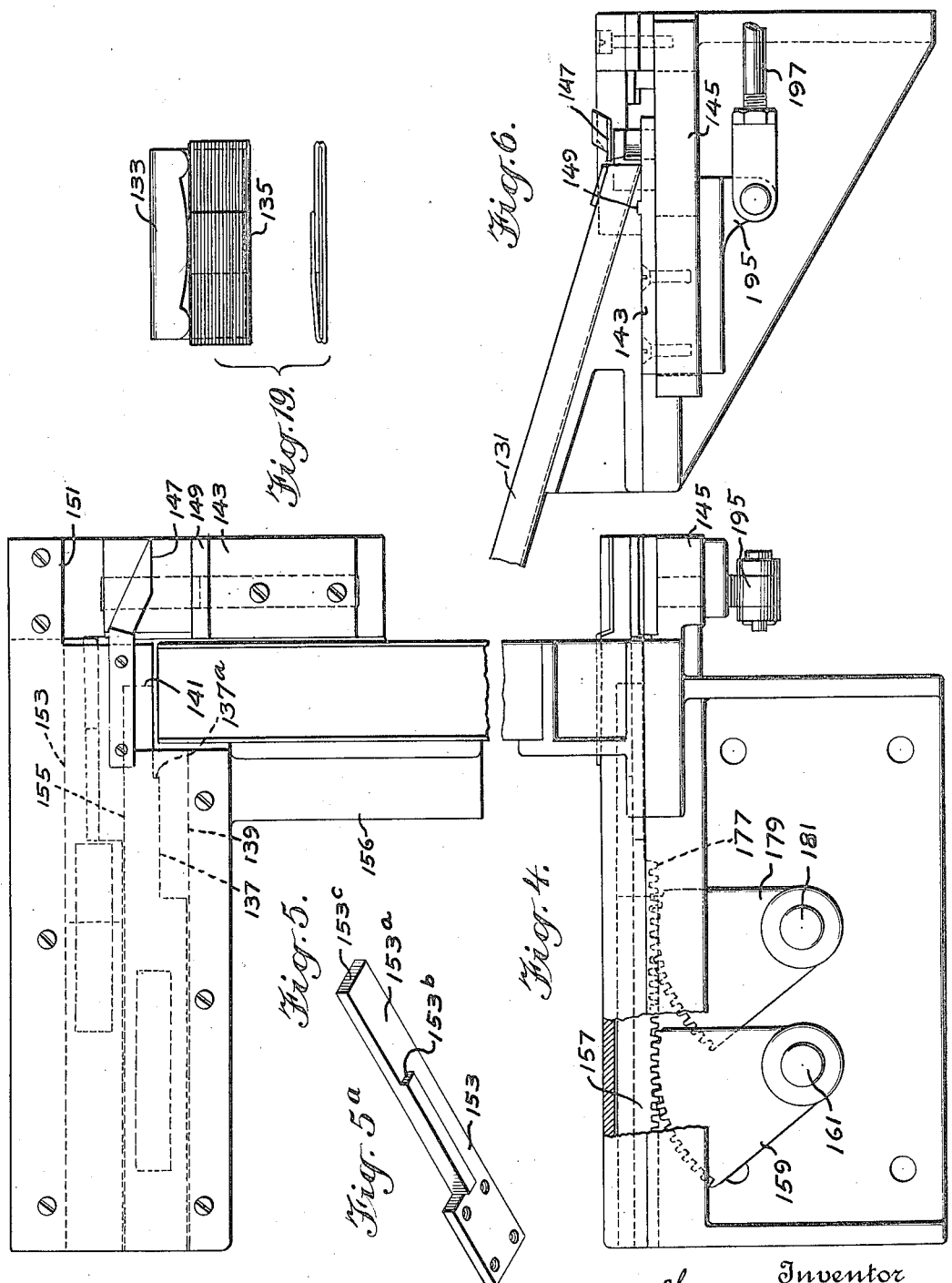

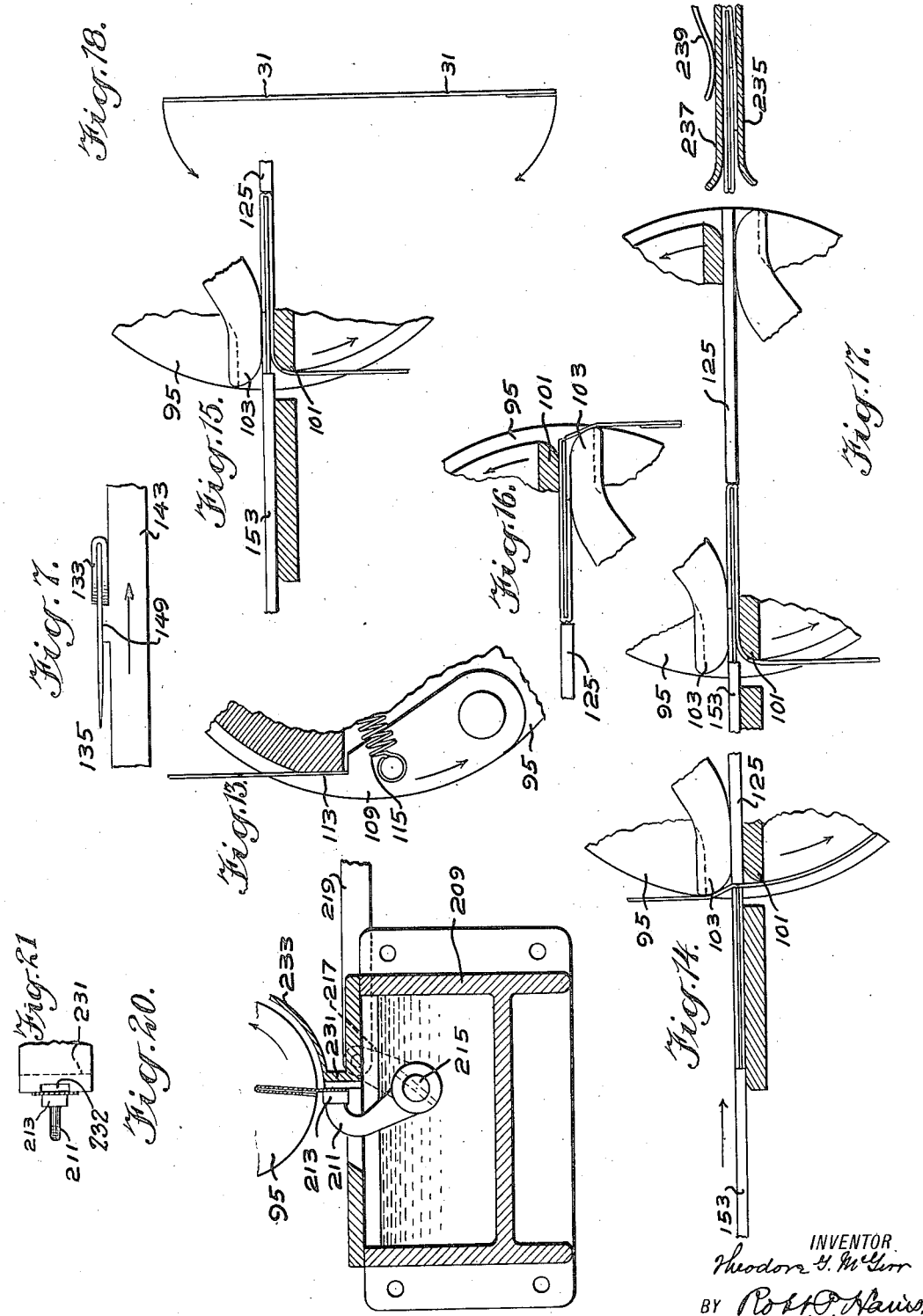

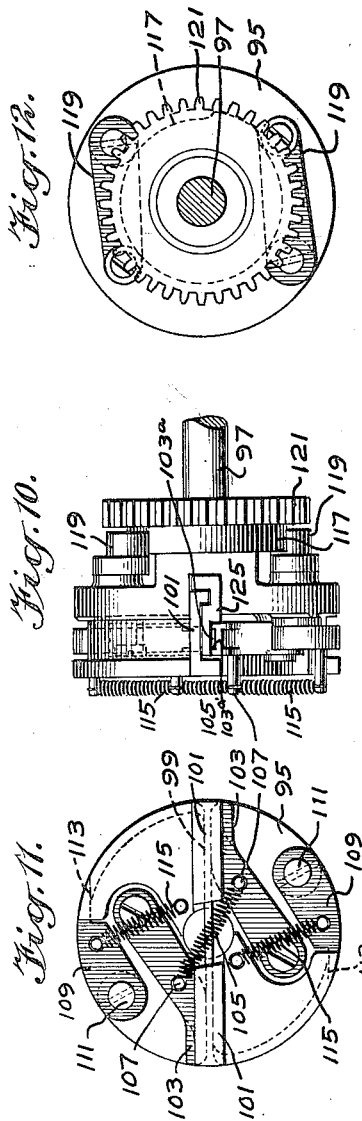
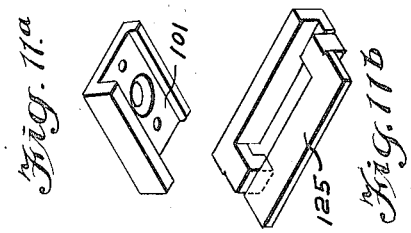
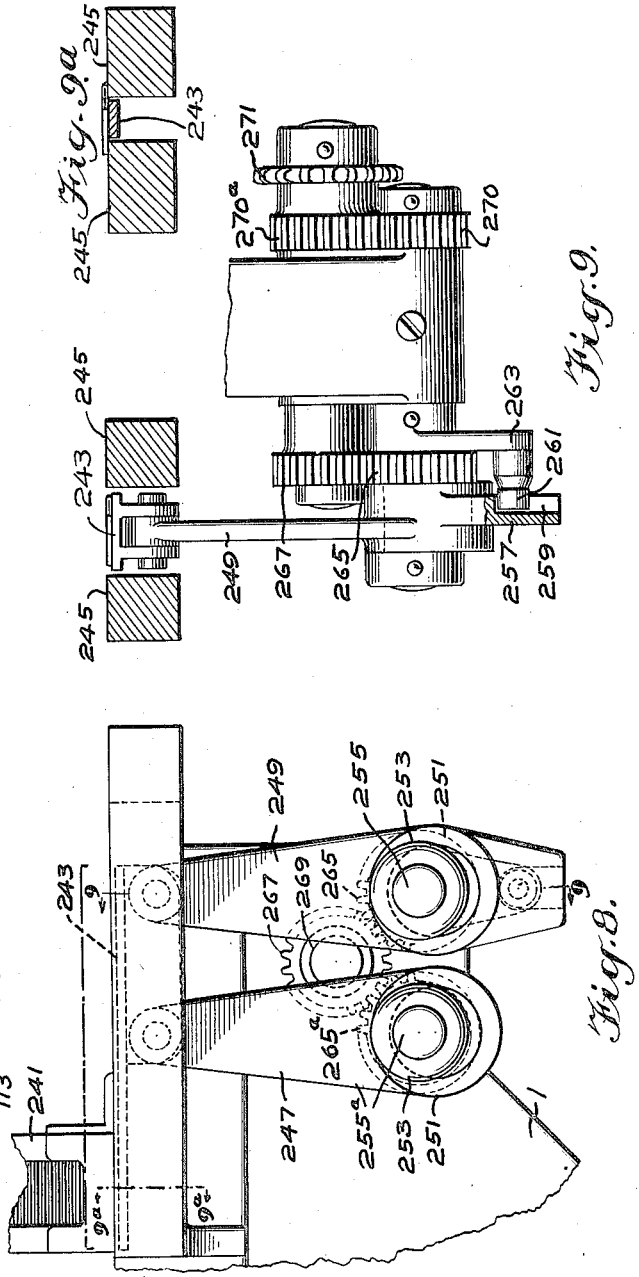

UNITED STATES PATENT OFFICE.

THEODORE G. McGIRR, OF SPRINGFIELD, MASSACHUSETTS.

MACHINE FOR APPLYING HOODS TO ARTICLES.

1,423,237. Specification of Letters Patent. Patented July 18, 1922.

Application filed May 4, 1918, Serial No. 232,464. Renewed November 28, 1921. Serial No. 518,479.

*To all whom it may concern:*

Be it known that I, THEODORE G. McGIRR, a citizen of the United States, residing at Springfield, county of Hampden, and State of Massachusetts, have invented an Improvement in Machines for Applying Hoods to Articles, of which the following description, in connection with the accompanying drawings, is a specification, like characters on the drawings representing like parts.

The invention hereinafter described relates to machines for applying protective bands or hoods to safety razor blades and other articles.

The character of the invention will be best understood from a description of one good form thereof selected to illustrate the same, it being understood, however, that my invention is not limited thereto.

In the drawings accompanying this description:—

Figure 1 is a front elevation of the machine selected to illustrate the invention;

Fig. 1ª is a detail of one of the blades for scoring the paper;

Fig. 2 is an end elevation of the machine;

Fig. 2ª is a face view of the cam for one of the blade feed plungers;

Fig. 2ᵇ is a face view of the cam for another of the blade feed plungers;

Fig. 2ᶜ is a face view of the cam for actuating the knife for severing the paper to form a band;

Fig. 2ᵈ is a face view of the Geneva gearing for feeding the paper into the machine;

Fig. 2ᵉ is a face view of the cam for actuating the adhesive applying device;

Fig. 3 is a plan of the machine;

Fig. 4 is a side elevation on an enlarged scale showing the plunger for feeding the blades from a chute toward the rotary folder, and actuating devices for said plunger, certain parts being broken away to disclose parts beyond the same;

Fig. 5 is a plan of the features shown in Fig. 4;

Figures 1, 1A:
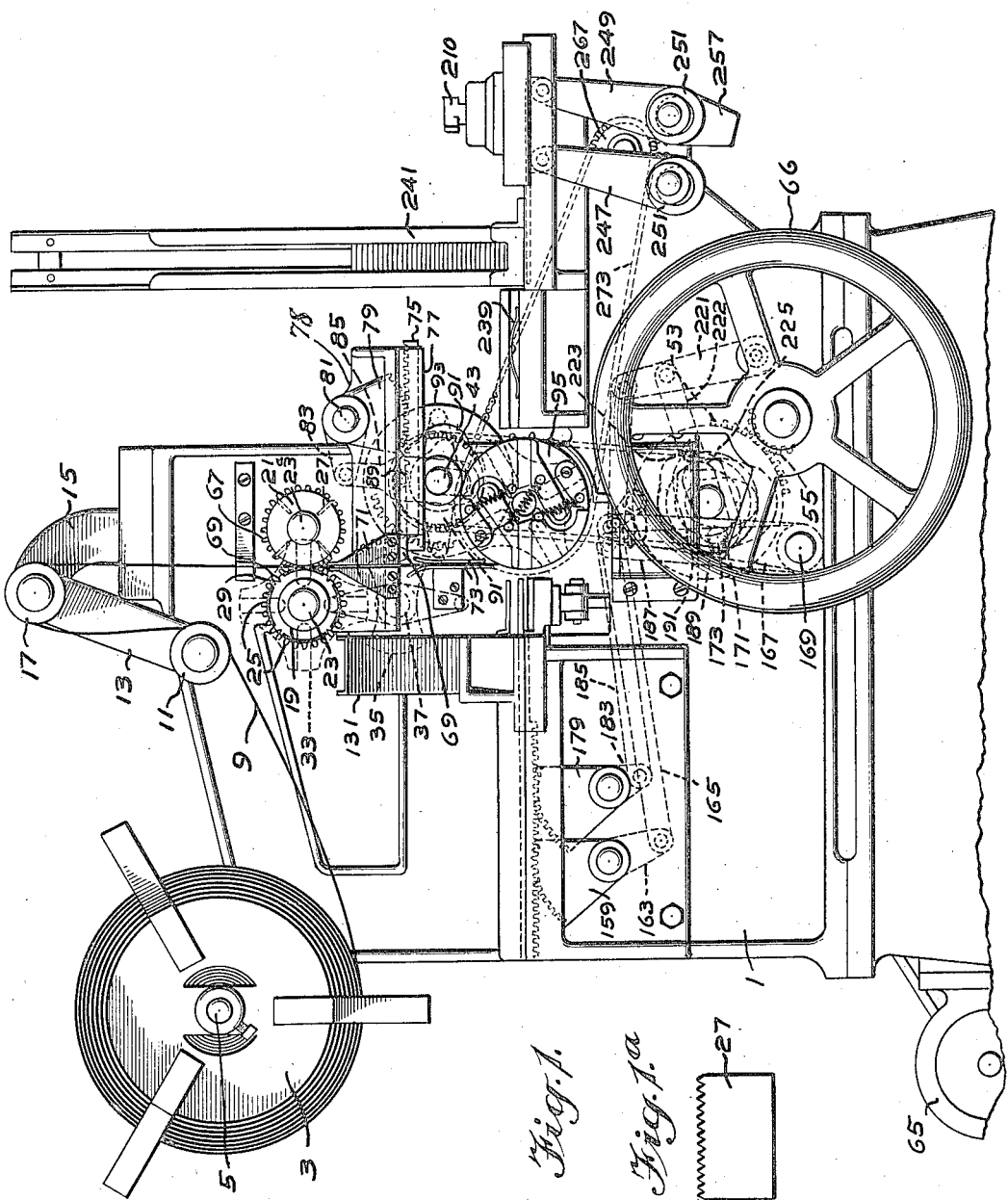

Fig. 5ª is a perspective view of one of the blade feed plungers;

Fig. 6 is an end elevation of the features shown in Figs. 4 and 5;

Fig. 7 is a detail of the cross feed plunger showing a blade in position to be fed thereby;

Fig. 8 is a front elevation on an enlarged scale of the device for stacking the blades after the bands have been applied thereto;

Fig. 9 is an end elevation of parts the devices shown in Fig. 8, and other parts being shown in section taken on line 9—9 of Fig. 8;

Fig. 9ª is a sectional detail taken on line 9ª—9ª of Fig. 8;

Fig. 10 is a front elevation of the rotary folder;

Fig. 11 is an end elevation of said folder;

Fig. 11ª is a perspective view of one of the guide jaws for the rotary folder;

Fig. 11ᵇ is a perspective view of the slide member guided by jaws such as shown in Fig. 11ª and reciprocable diametrically of the folder;

Fig. 11ᶜ is a perspective view of the slide of the rotary folder, and fixed jaws co-operating therewith;

Fig. 12 is an elevation of the opposite end of said folder;

Fig. 13 is a detail on an enlarged scale of a portion of the rotary folder showing the gripper for holding the bands in front of the folder;

Fig. 14 is a detail showing the blade presented to the band in front of the folder and in readiness to be thrust into the folder;

Fig. 15 is a view similar to Fig. 14 showing the position of the blade and the band after being thrust into the folder;

Fig. 16 is a detail showing a portion of the folder after rotation to position in readiness to deliver the blade and band therefrom;

Fig. 17 is a detail of the rotary folder and receiver showing the blade and band delivered from the folder to the receiver and the band completely wrapped about the blade, a succeeding blade and band having been inserted in the folder;

Fig. 18 is a detail of the band showing the scoring thereof and the position of the adhesive thereon;

Fig. 19 is a plan and edge elevation of the blade with the band applied thereto;

Fig. 20 is a detail on an enlarged scale of the device for applying the adhesive to one end of the band after the folder has been rotated to a position intermediate the positions thereof represented in Figs. 15 and 16; and Fig. 21 is a detail to be referred to.

In the particular machine selected herein to illustrate the invention, paper or other covering material may be drawn from a source of supply, and scored along spaced lines to facilitate folding thereof about the blade. Then the material is severed to form a band of the predetermined length required, and said band is presented to a rotary folder in readiness to receive the blade. The blades are progressively fed to the folder which applies the band to opposed faces of each blades. Then an adhesive is applied to one end of the band, and said end is folded over and secured to the opposite end of the band on delivery of the blade and band from the rotary folder. Finally, the covered blades are automatically stacked or assembled for convenient delivery from the machine.

With the foregoing preliminary explanation in mind, I will now describe in detail one good form of mechanism for performing the operations referred to.

Referring first to Figs. 1 and 2, 1 designates the machine frame which is suitably shaped and constructed to receive and support the various working parts of the machine. Suitable means is provided for supporting and feeding the covering material into the machine. In the present instance of the invention, this means comprises a reel 3 (Figs. 1 and 3) journalled on a stud shaft 5 carried by a bracket 7 mounted on the frame. The covering material which may be in the form of a ribbon of paper 9 is conducted past a tension device which may be in the form of a roller 11 mounted on the lower end of an arm 13 depending from a bracket 15 mounted on the top of the frame. The paper ribbon may be guided over a roller 17 at the upper end of said swinging arm and thence downward between a pair of feed rolls 19 and 21 fast on a shaft 23 and a stud 23$^a$ journalled in bearings on the frame. The feed roll 19 may have segments 25 of rubber or other material mounted on the periphery thereof for frictionally engaging and feeding the paper. The feed roll 21 may have toothed scoring blades 27 thereon projecting somewhat from the periphery thereof and co-operating with metal portions 29 intermediate the rubber segments 25. These metal portions may serve as anvils to work in opposition to the scoring blades 27 to produce the scoring of the ribbon along lines 31, as will be noted in Fig. 18. In the present instance, the roll 19 has four rubber segments and four anvils co-operating with four scoring blades on the roll 21, the construction being such that two scoring lines will be produced on the paper in the course of the rotation of a feed roll through an arc of 180°.

Suitable means may be provided to rotate said rolls step by step and lock said rolls against rotation between steps. In the present instance, to accomplish this, Geneva gearing may be provided comprising a female gear 33 (Figs. 1 and 2$^d$) fast on the shaft 23, and a male gear 35 fast on a shaft 37 journalled in bearings in the frame, said shaft being driven by a gear 39 fast thereon meshing with a gear 41 fast on a shaft 43 journalled in bearings in the frame. The shaft 43 has a sprocket wheel 45 fast thereon driven by a chain 47 from a sprocket wheel 49 fast on a shaft 51 journalled in bearings in the frame, the latter shaft being driven by a gear 53 meshing with a pinion 55 fast on the main driving shaft 57 journalled in bearings in the frame. The shaft 57 may have a pulley 59 fast on one end thereof driven by a belt 61 from a pulley 63 driven in turn by an electric motor 65 mounted on one end of the frame. To enable turning over or adjustment of the machine by hand, the main shaft 57 may have a hand wheel 66 fast on the end thereof opposite the pulley 59.

To rotate the feed roll 21, it may have a gear 67 (Fig. 1) fast on its stud 23$^a$ meshing with and driven by a gear 69 fast on the shaft for the feed roll 19.

By the construction described the ribbon of paper is drawn from the reel, and predetermined lengths are fed intermittently between the feed rolls and scored thereby.

Suitable means is provided for severing bands from the strip of the required length for wrapping about the blades. To accomplish this, a knife 69 (Fig. 1) may be provided adapted to sever the paper at a point between a pair of upper opposed guides 71 and a pair of lower spring guides 73 mounted on the frame. Suitable means is provided to cause the knife to cut the paper at the times when the feed rolls are locked by the Geneva gearing against rotation, and the paper is stationary. For this purpose, the knife may be mounted on a rack 75 adapted to reciprocate in a guide 77 mounted on a bracket 78 on the frame. Co-operating with this rack is a toothed sector 79 fast on a stud shaft 81 journalled in a bearing in the bracket 78 and having an arm 83 fast thereon. This arm may be connected to the upper end of a fork 85 adapted to slide up and down on the shaft 43 referred to. To impart this movement to said fork, it is provided with a follower 89 working in a cam groove 91 in a disk 93 fast on the shaft 43, referred to. The construction is such that in the course of the rotation of the cam disk, the fork will be lifted, thereby rocking the arm 83 and the toothed sector 79 in a clockwise direction (Fig. 1), and causing the knife to move to the left and sever the paper.

Having described the means for feeding the paper into the machine, the means for scoring the same, and the means for severing the requisite length of paper from the supply to produce the bands, next will be described the rotary folder for applying the bands to the blades. In the present instance of the invention, this folder comprises a box 95 (Figs. 1, 10, 11 and 12) mounted fast on the front end of a shaft 97 journalled in bearings in the frame. This box may have a passage 99 extending diametrically therethrough. Fixed channel shaped jaws 101 may be provided adjacent opposite ends of this passage, and movable jaws 103 may be provided to co-operate with said fixed jaws and are urged toward the latter by a coil spring 105 connected to pins 107 on the sides of said jaws. The construction is such that the movable jaws may swing on their pivots away from the fixed jaws to allow the blade and band to be thrust into the passage between said jaws, as more fully hereinafter described.

The rotary folder may be provided with means for taking the lower end of the band held between the spring guide members 73, referred to, and drawing the band downward across an end of the passage 99 in the folder. In the present form of the invention, this means comprises a pair of diametrically opposed grippers 109 fast on stud shafts 111 journalled on the box 95 and co-operating with abutments 113 on said box. The grippers are normally urged toward said abutments by coil springs 115 having their ends connected to pins on said grippers and pins on said box. To open said grippers at the times required to take the lower end of the band a cam 117 may be mounted loosely on the shaft 97 adjacent one end of the box 95, and engage followers 119 connected to the stud shafts 111 for the grippers 109. To rotate the cam 117, a gear 121 (Fig. 2) may be connected thereto and mesh with a gear 123 above it and fast on the shaft 43, referred to.

The passage 99 may be of an extent greater than twice the length of one of the blades. To deliver a blade with the band thereon from the rotary folder, a slide or member 125 may be mounted in the passage 99 and be in the form of a frame having side members 125$^a$ and end members 125$^b$ with grooves 125$^c$ in the latter opening at opposite faces of the slide. The fixed channel shaped jaws have flanges 101$^a$ and 101$^b$, the latter being somewhat narrower than the former. These channel jaws face in opposite directions, and are so spaced that the slide may reciprocate along said jaws with the slide grooves 125$^c$ fitting the channel flanges 101$^b$.

Suitable means may be provided for rotating the folder step by step through arcs of 90°, and means may be provided for locking the folder against rotation between said steps. To accomplish this, in the present instance, Geneva gearing is provided comprising a male gear 127 (Figs. 1 and 2) fast on the shaft 43, referred to, and co-operating with a female gear 129 fast on the shaft 97, referred to.

Having described the rotary folder and the means for presenting the band at one end of the passage of the folder, as shown in Fig. 14, next will be described the means for feeding the blades to be covered by the bands into the machine and to the folder. To accomplish this, in the present instance, a chute 131 may be mounted on the machine frame in inclined position and be adapted to receive the blades. In the machine here described, the blade is provided with a back 133 (Fig. 19) opposite the cutting edge 135 of the blade. It is desirable to protect the edges of the blade from engagement with the means for feeding the blade through the machine. Accordingly, the blades are delivered to the chute in upright position with their backs resting on the bottom of the chute. The blades gravitate toward the bottom of the chute and are adapted to be progressively fed therefrom. To accomplish this, a plunger 137 (Figs. 4, 5 and 6) may be mounted in and adapted to slide along a guideway 139 in the machine frame transversely to the length of the chute adjacent the delivery shoulder 137$^a$ adjacent the end thereof. The end 141 of this plunger is adapted to engage one end of the blade and thrust the same while in upstanding position transversely to the length of the chute onto a cross feed plunger 143 mounted in and adapted to slide along a guideway 145 on the machine frame. When in this position, the blade stands with its back on the cross slide and its upper portion in engagement with a guide or stop 147 fixed to the frame and above the path of the plunger 137. As the cross feed plunger advances, the back of the blade is carried forward while the upper portion thereof is temporarily arrested. As a consequence, the blade is tilted down onto the cross feed plunger to its position shown in Fig. 7. To positively feed the blade, the cross feed plunger may be provided with a shoulder or flange 149 adapted to engage the inner edge of the back of the blade. The cross feed plunger advances until the rear edge of the back of the blade is brought against a fixed stop 151, and thus the blade is confined between said stop and the shoulder of the cross feed plunger.

Now the blade is directly in front of one end of the passage 99 in the rotary folder. Suitable means is provided for thrusting the blade in the direction of its length into the passage of the folder. To accomplish this, in the present instance, a plunger 153 (Figs. 5 and 5$^a$) is provided mounted in and adapted to slide along a guideway 155 in a bracket 156 mounted on the machine frame. The plunger 153 works in a direction transverse to the path of movement of the cross feed plunger. The plunger has a portion 153$^a$ which moves over the blade and brings a shoulder 153$^b$ into engagement with an edge of the back of the blade and thrusts the latter from its position shown in Fig. 14 to its position shown in Fig. 15. In the course of this movement the leading end of the blade will engage the band at a point intermediate the ends thereof and thrust the band into the folder, thereby folding the band onto opposite faces of the blade, and leaving a free end of the band projecting downward as shown in Fig. 15.

If for any reason the machine should fail to present a blade in front of the plunger 153, the end 153ᶜ of the latter will engage the slide 125 and shift the same in the rotary folder and eject the previous blade from the folder and thereby prevent two blades from being present at the same time in one end of the folder.

Suitable means may be provided for reciprocating the plungers for feeding the blade from the chute into the rotary folder. To accomplish this, the plunger 137 may have a rack 157 (Fig. 4) on the under side thereof meshing with a toothed sector 159 fast on a rock shaft 161 journalled in bearings in the frame. This shaft may have an arm 163 (Figs. 1 and 2) fast thereon connected by a link 165 with a rocker arm 167 fulcrumed on a shaft 169 fixed on the frame. The arm 167 has a follower 171 adapted to work in a cam groove 173 in a disk 175 fast on the shaft 51, referred to. The plunger 153 may have a rack 177 on the under side thereof meshing with a toothed sector 179 fast on a shaft 181 journalled in bearings in the machine frame. An arm 183 fast on said shaft may be connected by a link 185 with a rocking arm 187 on the shaft 169, referred to. A pin 189 on the arm 187 works in a cam groove 191 in a disk 193 fast on the shaft 51, referred to. The construction of the camways in the disks is such that the plungers 137 and 153 will be reciprocated as required to feed the blade as described.

To reciprocate the cross feed plunger 143, it may have a lug 195 (Fig. 6) depending therefrom connected by a link 197 with a rocker arm 199, pivoted on a bracket 201 on the frame. A follower 203 on said arm works in a camway 205 in a disk 207 fast on the shaft 51, referred to. The construction is such that the cross feed plunger will be reciprocated to successively tilt and advance the blades as they are delivered thereon by the plunger 137 which moves transversely to the chute.

After the blade and the band have been delivered to the rotary folder, as shown in Fig. 15, a suitable adhesive is applied to the free end of the band depending from the folder. To accomplish this, a box 209 (Fig. 20) may be mounted on the frame beneath the rotary folder and contain a suitable adhesive. The adhesive may be heated by an electric heater of usual construction, and therefore, unnecessary to show and describe herein. The button 210 (Fig. 1) may control a switch in the electric circuit for this heater. To apply the adhesive to the band, an arm 211 may be provided having a head 213 of an extent less than the width of the band, said head being movable from a submerged position to a position above the box to apply the adhesive to the band. To give the head this movement, its arm 211 may be mounted on a shaft 215 mounted on the box, and having an arm 217 connected by a link 219 with an arm 221 (Fig. 1) pivoted on a shaft mounted on the frame. The arm 221 is connected to a fork 222 having a follower 223 working in a cam groove 225 of a disk 227 (Figs. 2 and 2ᵉ) fast on the shaft. Cooperating with the adhesive applying head 213 is an abutment 231 projecting upward from the box and having a recess 232 Fig. 21 somewhat wider than said head. The construction is such that when the folder is rotated quarter turn from its position shown in Fig. 15 to its position shown in Fig. 20, the free end of the band will be brought in front of the abutment 231. Then the head 213 is brought from its submerged position up against the free end of the band and applies the adhesive thereto. A shield 233 curves upwardly from the abutment 231 and serves to guide the free end of the band as the folder is rotated a second quarter turn from its position shown in Fig. 20 to its position shown in Fig. 16. In the course of this movement the free end of the band will wrap around one end of the blade and depend therefrom as shown in Fig. 16.

Since the head is narrower than the recess, it will not smear the adhesive on the abutment if a band should fail to be presented between the head and abutment in the course of the operation of the machine, and thus there will be no adhesive in the abutment to stick to the exterior of succeeding bands. The jaws 103 may have recesses 103ᵃ (Fig. 10) therein to prevent said jaws from contacting with the portion of the band to which the adhesive is applied.

Suitable means may be provided for folding the free end of the band with the adhesive applied thereto against the opposite end of the band. To accomplish this, in the present instance, a receiver is provided conveniently in the form of opposed plates 235 and 237 (Fig. 17) having their ends curving outwardly adjacent the folder to facilitate entrance of the blade and band therein. After the folder is rotated from its position shown in Fig. 16 to its position shown in Fig. 17, plunger 153 forces a succeeding blade into the folder, substantially as shown in Fig. 17. This causes the slide 125 to be pushed in advance of the entering blade and to thrust the preceding blade from the folder between the plates 235 and 237. In the course of this movement the free end of the band is folded up against the opposite end of the band as shown in Fig. 17. The upper plate 237 may be pressed by a spring 239 toward the lower plate 235, thereby pressing the adhesive end of the band into secure engagement with the opposite end of the band. The blade with the band thereon will be held between said plates until the next blade is delivered thereto. As a consequence, the blade will have sufficient dwell between said plates to allow the adhesive time to set.

Next will be described the means for automatically stacking the covered blades in readiness for delivery from the machine. To accomplish this, in the present instance, a stack holder 241 is provided on the machine frame adjacent the receiver, said stack holder being formed to receive the covered blades in superposed relation as shown in Fig. 1. When the succeeding blade is delivered from the folder, it will engage the blade in the receiver and thrust the same beneath the stack. Suitable means may be provided to lift the blades already in the stack to allow the incoming blade to be introduced at the bottom of the stack. To accomplish this, in the present form of the invention, a table 243 (Figs. 3, 8 and 9) may be provided beneath a ledge comprising a pair of members 245 at opposite sides of the table. This table is moved upward to lift the superposed blades already in the stack before the incoming blade is thrust beneath the stack. To accomplish this, the table may be mounted on and pivotally connected to the upper ends of a pair of arms 247 and 249 having hubs 251 on eccentrics 253 fast on a stud shaft 255 and shaft 255ᵃ journalled in bearings in the frame. The arm 249 has a heel 257 depending therefrom, with a groove 259 in the lower end thereof fulcrumed on a roller 261 carried by a bracket 263. To rotate the eccentrics, they are provided with pinions 265 and 265ᵃ fast thereon meshing with an intermediate pinion 267 on a stud 269. The shaft for the pinion 265ᵃ has a pinion 270 thereon meshing with a pinion 270ᵃ on the stud shaft 269. The pinion 270ᵃ has a hub with a sprocket 271 fast thereon driven by a sprocket chain 273 (Fig. 2) on a sprocket wheel 275 fast on the shaft 97, referred to. The construction is such that rotation of said eccentrics will cause the arms to move up and alternately raise and lower the table, and since the arm 249 is fulcrumed on the roller 261, the table will also have a reciprocatary movement. The composite movement thus obtained will cause the table to move intermittently in an elliptic path. As a result, the superposed blades will be lifted, thereby allowing the incoming blade to be thrust beneath the pile and then the table will move out from beneath the pile and allow the upper blades to rest on the lowest blade.

The operation of the machine will be readily understood from the foregoing description. The machine is simple and cheap in construction, reliable in operation, and capable of efficiently and rapidly applying the covers to the blades.

While the invention has been described more particularly in its use for wrapping blades, obviously it is adapted to wrap or apply covers to other articles.

It will be understood that the invention is not limited to the specific embodiment shown, but that various deviations may be made therefrom without departing from the spirit and scope of the appended claims.

What is claimed is:—

1. A machine for applying bands to articles, comprising, in combination, a rotary folder having a recess therein, means for rotating said folder step-by-step through four quarters turns, means for presenting a band in front of said recess on rotation of said folder through the first quarter turn, means to thrust an article against the band intermediate the ends of the latter and then thrust both into said recess thereby to fold the band about an end and opposed faces of the article, means to render adhesive a portion of the band projecting from the folder after the second quarter turn of the folder, said portion of the band being folded about the opposite end of the article on the third quarter turn thereof, and means to receive the article from the folder after the end of the third quarter turn thereof and fold the adhesive portion of the band against another portion of the band, said band presenting means being brought in a position to present a band to said recess at the end of the fourth quarter turn of the folder.

2. A machine for applying bands to articles, comprising, in combination, a rotary folder having a pair of passages therein, means to score a strip, means to sever a scored band from said strip, jaws on said folder, means intermittently to open said jaws that they may grasp bands and draw the same across opposite ends of said passages in the course of the rotation of said folder, a reciprocatory member to push the articles against the band and into said passages, thereby to fold the band against opposed faces of the article, means to render portions of said bands adhesive, opposed receiving members, means yieldingly to press one of the latter toward the other, and means to thrust the articles out from said passages and between said receiving members, thereby to complete folding of the bands about the articles.

3. A machine for applying bands to articles, comprising, in combination, a rotary folder having a recess therein, means to rotate said folder step-by-step through four quarter turns, means automatically to feed a band across one end of said recess in the course of the first quarter turn of the folder, means to engage the band intermediate the ends thereof and thrust an article and band into said recess at the end of the first quarter turn of the folder, thereby to fold the band onto opposed faces of the article and leave an end portion projecting from said passage, means to render the end portion of the band adhesive at the end of the second quarter turn of the folder, a receiver adjacent the folder having a passage in alignment with the folder recess at the end of the third quarter turn of the folder, said end portion of the band being folded about an end of the article in the course of the third quarter turn of the folder, and means for thrusting the article from the folder into said receiver and thereby fold the end portion of the band into adhesive engagement with another portion of the band to complete wrapping of the band about the article.

4. A machine of the character described, comprising, in combination, a rotary folder having recesses therein, jaws mounted on said folder at sides of said recesses, means yieldingly to press said jaws temporarily to hold articles in said recesses, grippers cooperating with portions of said folder to grasp ends of bands to draw the same from a source of supply across ends of said recesses on rotation of said folder, cam means for operating said grippers, means to rotate said cam means independently of said folder, and means to thrust the articles into and from said recesses.

5. A machine of the character described, comprising, in combination, a rotary folder having recesses therein, means to present bands at ends of said recesses in the course of the rotation of said folder, means to thrust articles against the bands and into said recesses, means to eject the articles from said recesses, means to receive an assembly of wrapped articles, means to transfer the articles successively from the rotary folder to said assembly receiving means, a member to move the assembly of articles from the path of an article transferred thereto, a pair of oscillatory arms connected to said member, eccentric means to reciprocate said arms, and means to rock said arms to move said member toward and from the assembly of articles.

6. A machine of the character described comprising, in combination, means to deliver razor blades having backs into the machine in upright position, means to tilt the blades successively from upright to flat position and then engage the inner edges of the backs of the blades to further feed the latter, a stop to engage the outer edge of the backs of the blades, a folding device, means to deliver bands to said folding device, and means to thrust the blades in the direction of the length thereof against said bands and into said folding device.

7. A machine of the character described, comprising, in combination, a step-by-step rotative folder having a recess therein, means to feed a wrapper strip toward said folder, means for feeding the strip across said recess on rotation of the folder a step, means for thrusting an article to be wrapped against said wrapper strip and into said recess, thereby to fold the strip about an end and onto opposed sides of the article with a portion of the strip projecting from said recess, means to apply adhesive to said projecting portion on rotation of the folder a further step, said portion being folded about the opposite end of the article on rotation of the folder a further step, and means for receiving the partially wrapped article from the folder and for folding the adhesive portion of the strip into engagement with another portion of the strip.

8. A machine for applying bands to articles, comprising, in combination, a rotary folder having a passage therein, means to introduce a band in front of one end of said passage, a slide in said passage, a receiver, and a feed member for thrusting an article against the band and into the folder passage, thereby to fold the band about an end and opposed faces of the article and shift the slide in the passage to eject a previously inserted article from the folder into the receiver, said feed member having a portion to engage and shift the slide to eject the previously inserted article in case an article is not presented to the feed member for insertion into the folder.

9. A machine of the character described comprising, in combination, means to deliver razor blades having backs into the machine in upright position, a folding device, means to deliver bands to said folding device, and means to thrust the blades in the direction of the length thereof against said bands and into said folding device.

In testimony whereof, I have signed my name to this specification.

THEODORE G. McGIRR.

Witnesses:
J. G. DUNNING,
HAZEL E. RICKER.